United States Patent
Gadd et al.

(12) 
(10) Patent No.: US 6,290,181 B1
(45) Date of Patent: Sep. 18, 2001

(54) DEPLOYABLE CREW QUARTERS

(75) Inventors: Timothy Michael Gadd, League City; Martin R Fraske, Pearland; Richard W. May, Taylor Lane Village; William M Otto, Friendswood, all of TX (US)

(73) Assignee: Spacehab, Inc., Washington, DC (US)

( * ) Notice: Subject to any disclaimer, the term of this patent is extended or adjusted under 35 U.S.C. 154(b) by 0 days.

(21) Appl. No.: 09/430,255

(22) Filed: Oct. 29, 1999

(51) Int. Cl.[7] ................ B64G 1/10; B64G 1/12; B64C 1/22; B64D 11/00
(52) U.S. Cl. ............... 244/159; 244/137.2; 244/162; 244/118.5
(58) Field of Search ................. 244/159, 162, 244/137.1, 137.2, 118.5, 118.2; 105/319, 321, 329.1

(56) References Cited

U.S. PATENT DOCUMENTS

| | | | |
|---|---|---|---|
| 147,538 | * 2/1874 | Woodruff | 105/319 |
| 166,792 | * 8/1875 | Lucas | 105/321 |
| 533,031 | * 1/1895 | Breed | 105/317 |
| 4,643,375 | * 2/1987 | Allen | 244/159 |
| 4,964,597 | * 10/1990 | Hijazi | 244/159 |
| 5,024,398 | * 6/1991 | Riedinger et al. | 244/118.5 |
| 6,007,025 | * 12/1999 | Coughren et al. | 244/118.5 |
| 6,101,766 | * 8/2000 | Mogensen | 244/118.5 |

* cited by examiner

Primary Examiner—Charles T. Jordan
Assistant Examiner—Christian M. Best
(74) Attorney, Agent, or Firm—Rossi & Associates

(57) ABSTRACT

A deployable crew quarters incorporates folding panels and acoustic panels to provide a lightweight on-orbit crew quarter. The deployable crew quarters preferably includes a frame and a plurality of panels mounted to the frame. At least one of the panels is hinged to the frame to allow movement between a stowed position and a deployed position. More specifically, the panels include a front panel coupled to the frame and two side panels moveable coupled to the frame. The two side panels are moveable between a stowed position and a deployed position. Still further, a top panel is also preferably moveable coupled to the frame, wherein the top panel is moveable between a stowed position and a pop-up deployed position. The front panel includes a sliding door panel to allow crew access to the deployable crew quarters. The front panel also preferably extends outward from the frame, which provides space in which a ventilation mechanism can be mounted. Further, fabric panels are attached to the side panels and over the rear opening of the deployable crew quarters to dampen noise.

17 Claims, 5 Drawing Sheets

DEPLOYABLE CREW QUARTERS

FIELD OF THE INVENTION

The invent ion relates in general to a crew quarters for a space vehicle that provides a private area for personnel aboard the space vehicle. More specifically, the crew quarters collapses to a compact size during launch and incorporates fold out wall and ceiling panels that can be deployed in orbit to provide a personal pressurized crew quarters for crew members.

BACKGROUND OF THE INVENTION

The advent of long duration space flight aboard orbiting space stations has lead to a recognition of the need for a private pressurized cabin areas for crew members. The lack of private space that can be personalized to the needs of a particular individual can lead to difficulties in moral among crew members. Prior attempts to utilize sleeping bags deployed in normal work space have proven less than satisfactory, as they do not provide crew members with permanent space that can be utilized for private use, and they do not isolate the crew members from the noise associated with station operation. The incorporation of hard shell crew cabins would overcome the problems associated with utilizing sleeping bags, but such cabins would result in the addition of undesirable weight and unutilized volume during launch operations.

In view of the above, it is an object of the invention to provide a lightweight crew quarters that can be collapsed to minimize launch volume and then deployed in orbit. It is a further object of the invention to provide a lightweight deployable crew quarters that will provide a private personalized space for crew members that is acoustically insulated to isolate crew members from station noise when resting.

SUMMARY OF THE INVENTION

The present invention provides a deployable crew quarters that incorporates folding panels and acoustic panels to provide a lightweight on-orbit crew quarter. The deployable crew quarters preferably includes a frame and a plurality of panels mounted to the frame. At least one of the panels is hinged to the frame to allow movement between a stowed position and a deployed position.

More specifically, the panels include a front panel coupled to the frame and two side panels moveable coupled to the frame. The two side panels are moveable between a stowed position and a deployed position. Still further, a top panel is also preferably moveable coupled to the frame, wherein the top panel is moveable between a stowed position and a pop-up deployed position. The front panel includes a sliding door panel to allow crew access to the deployable crew quarters. The front panel also preferably extends outward from the frame, which provides space in which a ventilation mechanism can be mounted. Further, fabric panels are attached to the side panels and over the rear opening of the deployable crew quarters to dampen noise.

Other advantages and features of the invention will become apparent from the following detailed description of the preferred embodiments of the invention and the accompanying drawings.

BRIEF DESCRIPTION OF THE DRAWING

The invention will now be described with reference to certain preferred embodiments thereof and the accompanying drawings, wherein.

DETAILED DESCRIPTION OF THE PREFERRED EMBODIMENTS

Figure 1:
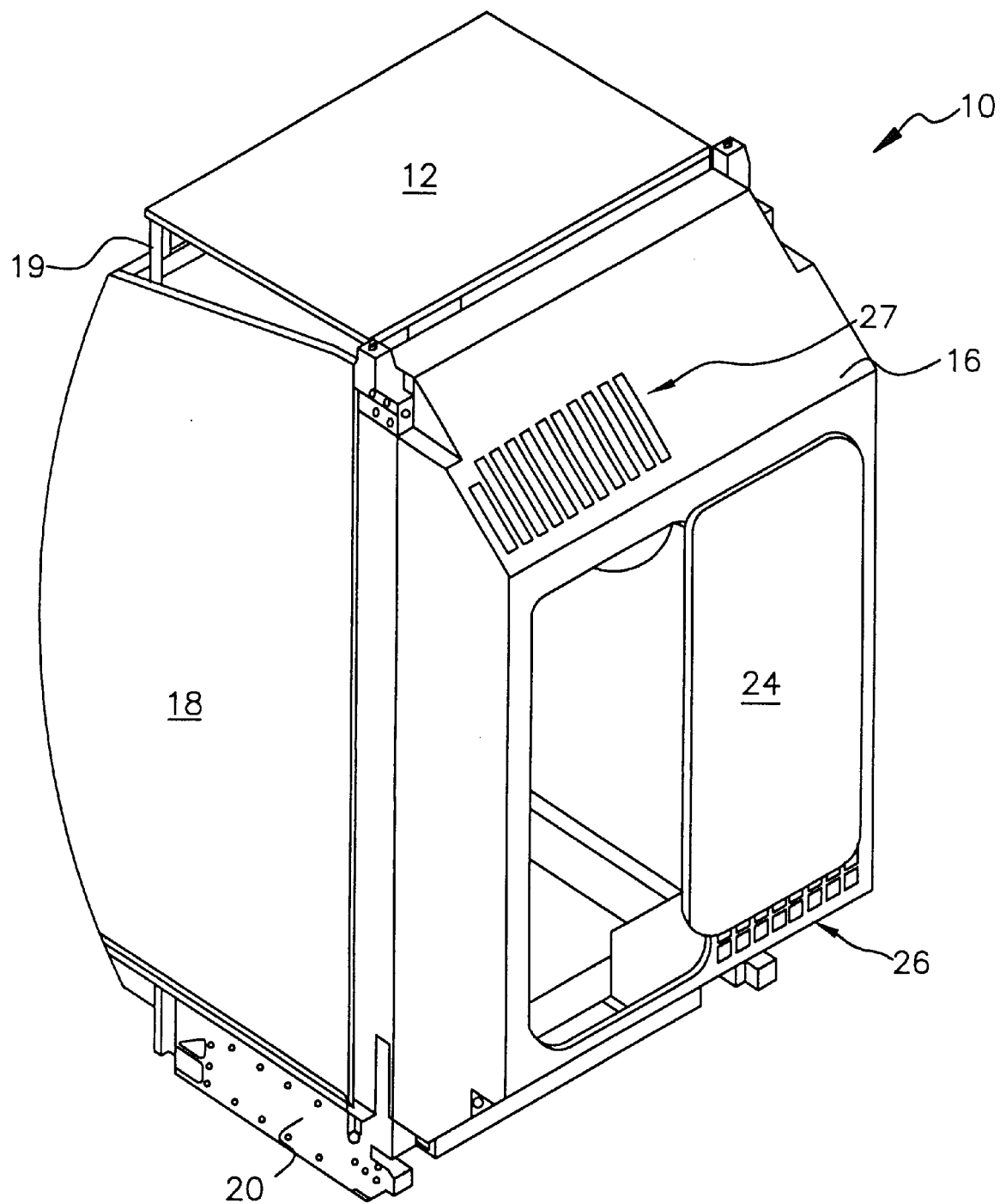
FIG. 1 is a front oblique view of a deployable crew quarters in accordance with the invention in a fully deployed configuration ready for use.
Figure 2:
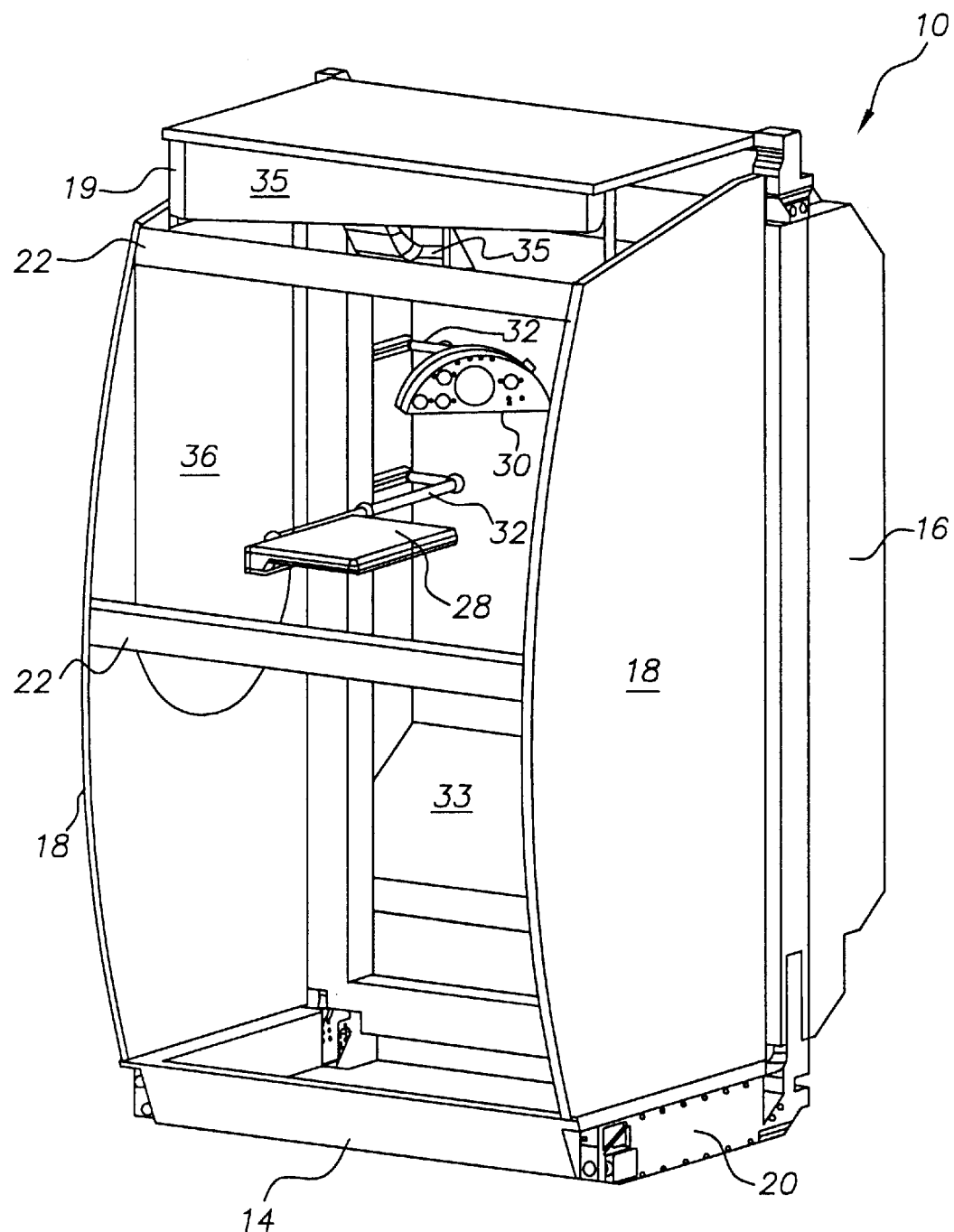
FIG. 2 is a rear oblique view of a deployable crew quarters in accordance with the invention in a fully deployed configuration ready for use.

FIGS. 1 and 2 respectively illustrate a front oblique view and a rear oblique view of a deployable crew quarters 10 in accordance with the invention, which is fully deployed for use on an orbiting vehicle. The deployable crew quarters 10 includes a pop-up ceiling panel 12, a floor panel 14, a bump out front panel 16 and side panels 18 that are supported on a frame 20. The frame 20 is provided with standard connection points so that it can be easily coupled within a cargo bay of a transport vehicle and then to the interior of a vehicle in which it is to be deployed. The ceiling panel 12 and the side panels 18 are hinged so that they can be folded substantially flush against the frame 20 during launch operations. The side panels 18 are supported in the open position illustrated by rear braces 22 that extend between the side panels 18, such that the rear of the deployable crew quarters 10 is essentially structurally open at the rear. The ceiling panel 12 is supported in the raised position by supports 19 that are connected to either the side panels 18 or one of the rear braces 22. The rear braces 22 and the supports 19 can either be respectively attached in a folding manner to the side panels 18 and ceiling panel 12, or they can be stowed within the deployable crew quarters 10 during launch and then attached upon deployment.

The bump out front panel 16 includes a sliding door 24 and ventilation inlet openings 26 and ventilation exhaust openings 27 to allow for air circulation within the deployable crew quarters 10. In addition, various elements, such as a work tray 28 and display and control panel 30, are mounted on folding arms 32 to the bump out front panel 16, such that the elements can be stowed within the volume of the front panel 16 on launch and then deployed for use in orbit. In the illustrated embodiment, for example, the front panel 16 includes an integrated fan unit (not shown) located behind an access panel 33 mounted to the front panel 16, which assists in circulating air within the deployable crew quarters 10 from the ventilation inlet openings 26, through ducts 35 and ultimately to the ventilation exhaust openings 27.

The display and control panel 30 includes controls that permits a crew member to control the integrated fan unit, lighting provided within the deployable crew quarters 10, and communication devices, for example an intercom, that allows the crew member to communicate with other areas of the vehicle in which the deployable crew quarters 10 is located. Alternatively, a direct communication link may be provided between the deployable crew quarters 10 and the ground, thereby allowing the crew member to directly communicate with friends and family within the comfort of their own personalized living space. Still further, the display and control panel 30 may include personal entertainment devices, such as audio or video compact disc players, to allow crew members to choose entertainment that conforms to their particular tastes without disturbing other crew members.

Figure 3:
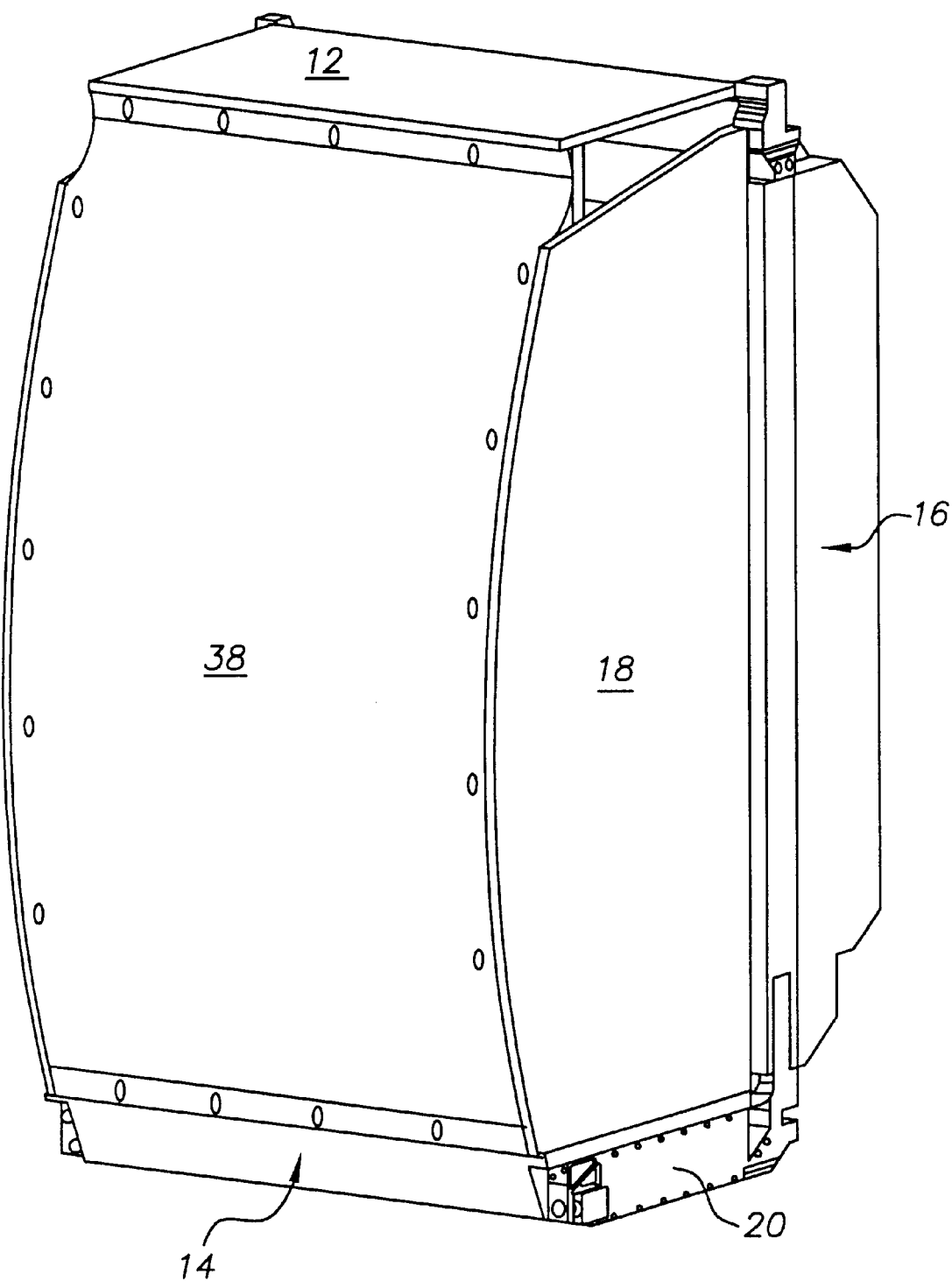
FIG. 3 is a rear oblique view of a deployable crew quarters in accordance with the invention with a fabric panel in place.

As shown in FIG. 2, the side panels 18 are preferably lined with replaceable and removeable fabric panels 36 that act as acoustic (Absorption) dampeners to reduce noise within the deployable crew quarters 10, as well as providing a pleasing appearance (both by color and texture) that can be personalized to individual tastes. In one embodiment, the replaceable fabric panels 36 are composed of a material that allows a conventional hook-and-loop type fastener to be attached to the fabric panels 36. Thus, a crew member may attach items on the fabric panels 36 to prevent them from floating within the deployable crew quarters 10. In order to further reduce noise within the deployable crew quarters 10, a rear fabric panel 38 is also preferably draped over the back of the deployable crew quarters 10 (as shown in FIG. 3) prior to installation of the deployable crew quarters 10 against a wall of a space vehicle.

Figure 4:
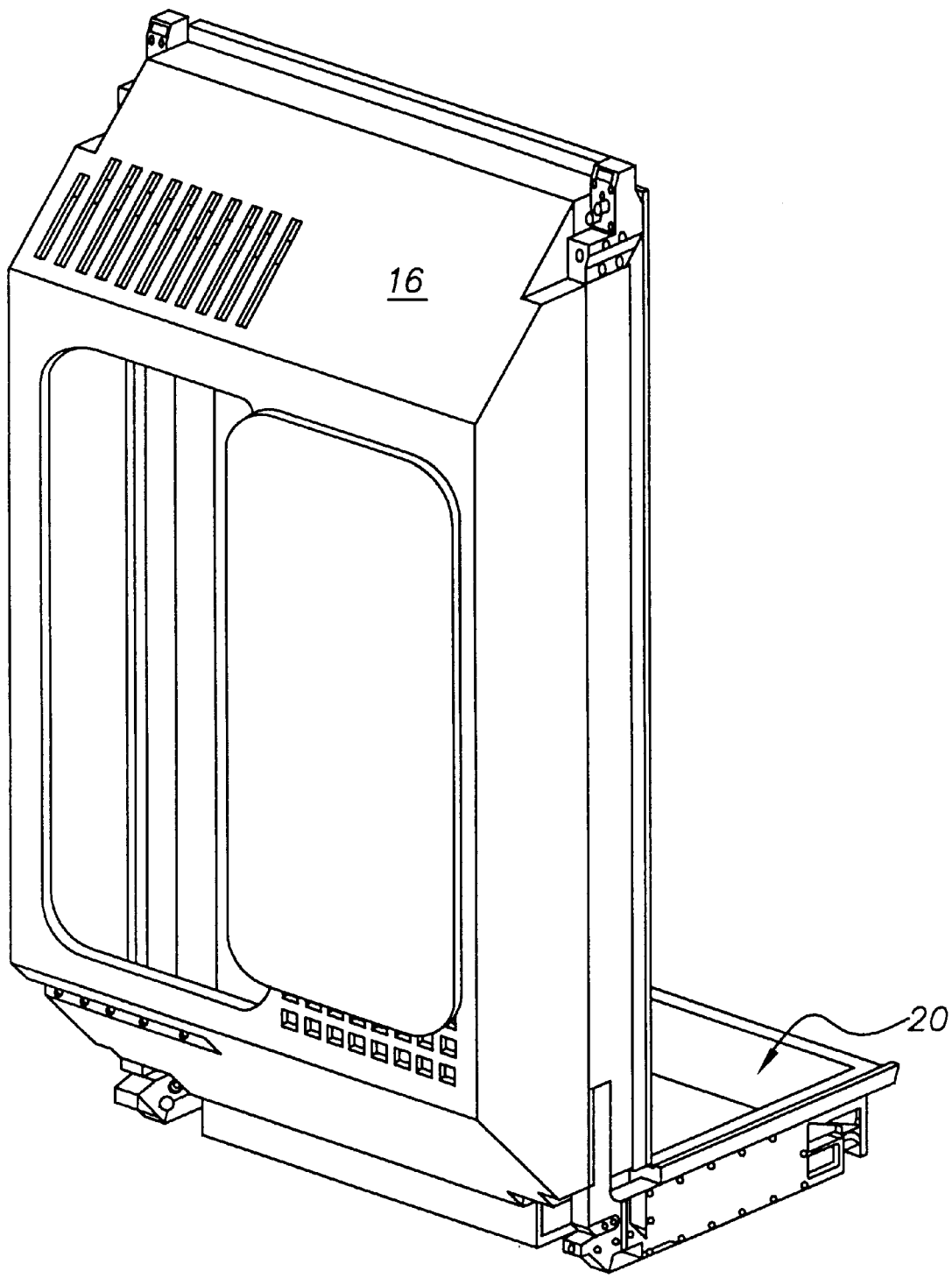
FIG. 4 is a front oblique view of a deployable crew quarters in accordance with the invention in a fully stowed position ready for launch.
Figure 5:
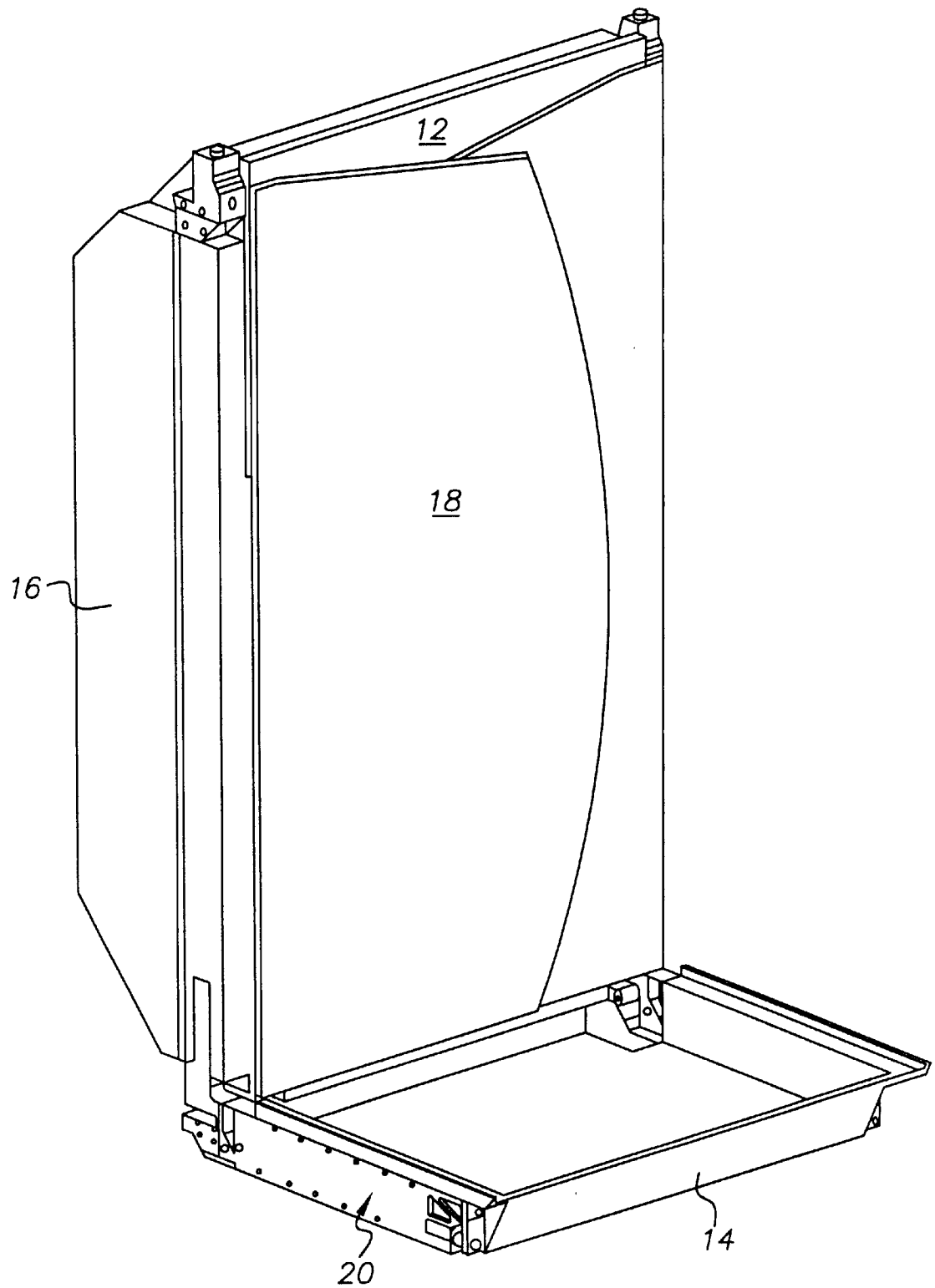
FIG. 5 is a rear oblique view of a deployable crew quarters in accordance with the invention in a fully stowed position.

FIGS. 4 and 5 respectively illustrate a front oblique view and a rear oblique view of a deployable crew quarters 10 in a stowed position. FIG. 5 illustrates how the top panel 12 and side panels 18 are folded to reduce the cargo volume required by the crew quarters 10 during launch. Although the illustrated embodiment utilizes a fixed "L" shaped frame 20, it is also possible to hinge the lower portion of the frame 20 so that the floor panel 14 can also be folded upward. Alternatively, if the deployable crew quarters 10 is mounted in a vehicle such that the vehicle structure provides the floor, the floor panel 14 can be deleted.

While offering the structural support advantages of a hard shell rack, the deployable crew quarters 10 provides greater internal volume to accommodate full anthropometric range for the 95$^{th}$ percentile American male. The upper half of the deployable crew quarters 10 provides additional elbow room and the integrated pop-up ceiling panel 12 provides additional headroom. The pop-up ceiling panel 12 also permits the interior height to protrude outside the limits of a standard rack. The present invention preferably provides an interior height to 77.5 inches. Thus, a 95$^{th}$ percentile male, who is 77 inches tall in a zero gravity environment, can stand up in the deployable crew quarters 10 with 0.5 inches of headroom.

The invention has been described with reference to certain preferred embodiments thereof. It will be understood, however, that modification and variations are possible within the scope of the appended claims. For example, the deployable crew quarters can be formed in any desired shape or configuration required to fit within the vehicle in which it is to be deployed. Still further, the side panels and ceiling panel may be formed of a solid panel or alternatively may include integrated sound insulation materials.

What is claimed is:

1. A deployable crew quarters for a space vehicle comprising:
   a frame;
   a front panel coupled to the frame, having an access opening; and
   two side panels moveably coupled to the frame;
   wherein the two side panels are moveable between a stowed position for launch and a deployed position for use.

2. A deployable crew quarters for a space vehicle as claimed in claim 1, further comprising a top panel moveably coupled to the frame, wherein the top panel is moveable between a stowed position and a deployed position.

3. A deployable crew quarters for a space vehicle as claimed in claim 1, further comprising a floor panel coupled to the frame.

4. A deployable crew quarters for a space vehicle as claimed in claim 1, wherein the front panel includes a sliding door panel.

5. A deployable crew quarters for a space vehicle as claimed in claim 1, wherein the front panel extends outward from the frame, and wherein a means for providing ventilation is provided on the front panel.

6. A deployable crew quarters as claimed in claim 1, wherein the deployed crew quarters occupies a larger volume when the two side panels are in the deployed position than when the two side panels are in the stowed position.

7. A deployable crew quarters for a space vehicle comprising:.
   a frame:
   a front panel coupled to the frame;
   two side panels moveablv coupled to the frame; and
   fabric panels coupled to the side panels;
   wherein the two side panels are moveable between a stowed position for launch and a deployed position for use.

8. A deployable crew quarters for a space vehicle comprising:
   a frame;
   a front panel coupled to the frame;
   two side panels moveably coupled to the frame, wherein the two side panels are moveable between a stowed position for launch and a deployed position for use; and
   a rear fabric panel configured to cover a rear portion of the deployable crew quarters with the side panels in the deployed position.

9. A deployable crew quarters for a space vehicle as claimed in claim 1, further comprising a control panel provided within the deployable crew quarters.

10. A deployable crew quarters for a space vehicle as claimed in claim 1, wherein the control panel includes communication controls.

11. A deployable crew quarters for a space vehicle comprising:
    an "L" shaped frame, having a first "L" shaped side member and a second "L" shaped side member which are coupled together with an upper connecting member, a lower rear connecting member, and a lower front connecting member;
    a front panel coupled to the "L" shaped frame; and
    a first side panel and a second side panel which are respectively moveably coupled to the first "L" shaped side member and the second "L" shaped side member;
    wherein the two side panels are moveable between a stowed position for launch and a deployed position for use, and the deployed crew quarters occupies a larger volume when the two side panels are in the deployed position than when the two side panels are in the stowed position.

12. A deployable crew quarters for a space vehicle as claimed in claim 11, further comprising a top panel moveably coupled to the upper connecting member, wherein the top panel is moveable between a stowed position and a deployed position.

13. A deployable crew quarters for a space vehicle as claimed in claim 11, further comprising a floor panel coupled to the "L" shaped frame.

14. A deployable crew quarters for a space vehicle as claimed in claim 11, wherein the front panel includes a sliding door panel.

15. A deployable crew quarters for a space vehicle as claimed in claim 11, wherein the front panel extends outward from the "L" shaped frame, and wherein a means for providing ventilation is provided on the front panel.

16. A deployable crew quarters for a space vehicle as claimed in claim 11, further comprising a control panel provided within the deployable crew quarters.

17. A deployable crew quarters for a space vehicle as claimed in claim 16, wherein the control panel includes communication controls.

* * * * *